Patented June 17, 1941

2,246,315

UNITED STATES PATENT OFFICE 2,246,315

METHOD OF MAKING SPONGE RUBBER

Linwood A. Murray, Jr., Passaic, N. J., assignor to United States Rubber Company, New York, N. Y., a corporation of New Jersey No Drawing. Application July 13, 1939,
Serial No. 284,158

2 Claims. (Cl. 260—723)

This invention relates to methods of making sponge rubber and more particularly to making sponge rubber from latex.

Sponge rubber has been made by converting latex into a foam, shaping the foam and coagulating the latex in the foam, as by gelling, to form sponge rubber. There are many known methods of preparing stable uncoagulated latex foams which after shaping may be readily converted into sponge rubber. For example, air may be bubbled into a body of latex containing a foam stabilizing agent, such as soap, and the resultant foam may be agitated to subdivide the bubbles and form a stiffer foam. The air may be beaten into a compounded latex by means of a suitably designed apparatus similar to a cake mixer or egg beater. The latex may be foamed by means of a gas generated in situ, either by the decomposition of a chemical compound such as hydrogen peroxide, or by the interaction of two or more chemicals to form a gas as by the reaction between a carbonate and an acid, or by the reaction between an active metal and a base, as the reaction between powdered magnesium and potassium hydroxide. The latex may be foamed by applying a vacuum to a container containing a latex which is capable of being frothed under reduced pressure by escape of gas dissolved in the latex or by production of gas in the latex as by chemical decomposition or heating. A latex compound may be foamed by impregnating it with a gas under pressure such as nitrous oxide or carbon dioxide and subsequently releasing the pressure.

The latex foamed by any of these known methods may be shaped by pouring into molds having the proper size and configuration, following which the latex in the foam may be coagulated to form sponge rubber by causing the foam to gel or set. The gelling of the latex foam may be brought about in a variety of ways. There may be added to the latex, either before or after it is foamed, certain heat-sensitizing agents, which act to cause a latex compound to coagulate or gel when it is heated above some critical temperature. Among such known heat-sensitizing agents are the di- and tri-valent metal salts, complex zinc-ammonia salts, ammonium salts of strong acids, certain aryl subsituted guanidines, easily hydrolyzable esters, ammonium persulfate, and the salts of fluosilicic acid. Certain sensitizing agents, notably the alkali metal silico fluorides, possess the useful property of causing a latex foam to gel at room temperature after a lapse of time which is inversely dependent upon the amount of sensitizer added.

After the latex foam has been shaped and gelled to form sponge rubber, it is generally vulcanized and dried. Vulcanization may be brought about by heating the gelled sponge while in a mold before removing and drying the sponge, or the gelled sponge may receive only a partial vulcanization in the mold after which it may be removed from the mold, and the remaining vulcanization permitted to take place during the drying.

It has been found extremely difficult in these prior processes to control the amount of shrinkage which the sponge undergoes during drying, and at the same time to control the internal sponge structure. In general, it is desired to produce a sponge having a closely knit internal structure and to avoid the formation of a sponge having a loose, crumbly or cake-like internal structure. Sponge having the desired closely knit structure, when viewed in cross section, shows a more or less closely packed array of slightly distorted interconnecting spheroidal cavities, in which each cavity is surrounded by a smooth sheath or film of rubber perforated here and there by openings which are essentially circular. On the other hand, sponge having the undesirable loose or cake-like structure, when viewed in cross section, shows a more or less ragged array of irregularly shaped cavities which may be crossed at one or more points by ragged fibers of rubber. In the most objectionable form the structure is stereoreticulate. The differences in the physical properties of sponges exhibiting the two types of structures are particularly marked. A sponge having the desired closely knit structure has, in general, a higher elastic modulus than one having the loose cake-like structure. Furthermore, a closely knit sponge shows a greater resistance to mechanical breakdown from repeated and continued flexing. These two properties together mean that a sponge of the proper structure will have a greater load carrying capacity and a longer service life than will one of the loose cake-like structure.

I have found that the shrinkage which takes place when the sponge passes from the wet gelled state to the dried product can be reproducibly controlled within very narrow limits and that a closely knit sponge structure can be assured if the latex is preliminarily compounded with .15 to .25% of sulphur based on the rubber content of the latex, substantially all this sulphur chemically combined with the rubber in the latex, and thereafter the necessary additional free sulphur added and the latex converted into a foam.

In carrying out the invention there is added to the latex to be foamed an amount of sulphur equivalent to .15 to .25% of the rubber weight together with the necessary vulcanizing ingredients to cause substantially all this sulphur to chemically combine with the rubber in the latex when the latex is heated to any permissible temperature for the desired length of time. Other latex compounding ingredients may be added to the latex before the vulcanizing treatment, provided that such added ingredients will not in connection with the vulcanizing treatment coagulate or destabilize the latex. The additional sulphur for producing the desired final state of vulcanization of the finished product, and other compounding ingredients, such as gelling agents, not added to the latex prior to its preliminary vulcanization, may be added to the latex either before it has been foamed and gelled, or after the latex has been converted into a foam and before it has gelled. In general, the combined sulphur content of the finished sponge should be at least .7% and preferably over 1%, based on the rubber content.

The latex containing .15 to .25% of combined sulphur may be converted into an uncoagulated foam by any of the known means, as for example, aeration or whipping, or by chemical or other means. After conversion into the desired shape, as by molding, the foam may be gelled to sponge rubber and thereafter dried and vulcanized.

It has been found that maintaining the combined sulphur content of the latex between .15 and .25% assures a final sponge of the desired closely knit structure whose shrinkage during drying is reproducible within very narrow tolerances. Latices which contain less than .15% combined sulphur produce in the majority of cases a sponge having the undesirable crumbly or cake-like structure, whereas latices containing more than .25% combined sulphur produce undesirably weak and tender products.

The following example illustrates the process f the present invention:

A compound of the following formula was prepared:

| | Parts by weight |
|---|---|
| Latex { Rubber | 100 |
| Water | 60 |
| NH₃ | 0.2 |
| Sulphur, 62.5% aqueous paste | 0.32 |
| Zinc diethyl dithiocarbamate, 50% aqueous paste | 2.2 |
| Zinc mercaptobenzothiazole, 50% aqueous paste | 0.5 |
| Antioxidant, 50% aqueous paste | 2.0 |
| Casein, 10% aqueous solution | 2.5 |
| Potassium oleate, 20% aqueous solution | 10.0 |

The latex used was an ammonia-preserved Hevea latex which had been concentrated by centrifuging and which contained 0.65% ammonia. The ammonia content was reduced to 0.2% by aeration. The compounding ingredients were in the form of the usual aqueous pastes or solutions and the proportions in the above formula include the water therein. The compounded latex was placed in a suitable container and heated at 110° F. for twenty-four hours, which was sufficient in the presence of the dithiocarbamate and mercaptobenzothiazole accelerator combination to cause substantially all of the 0.2 part of sulphur to combine with the rubber. After this preliminary vulcanization step, there was added to the latex compound, for every 100 parts by weight of rubber, 2.9 parts by weight (wet) of a 62.5% aqueous paste of sulphur and 1.4 parts by weight (wet) of a 35% aqueous solution of castor oil soap. The thus compounded latex was then placed in an electrically driven cake mixer and air was beaten into the compound for fifteen minutes until the foam density was about 0.13. There was then mixed into the foam 5.4 parts (wet) of a 50% aqueous paste of zinc oxide and 2.0 parts (wet) of a 50% aqueous paste of sodium silicofluoride for every 100 parts of dry rubber. The foam was then poured into suitably shaped molds and allowed to gel at room temperature (73° F.). At 73° F. the foam gelled in between six and eight minutes. The gelled sponge, while still in the mold, was subjected to a final vulcanization in air at 250° F. for ninety minutes. After vulcanization the sponge was stripped from the mold and dewatered in a centrifugal drier, following which the sponge was dried in a current of dry air at 160° F. for fourteen hours. The sponge shrank 9% linearly during vulcanization and drying, and had the desired closely knit cell structure, a high tensile strength and a satisfactory elastic modulus. Sponges made according to the above example will show a reproducible linear shrinkage of between 8 and 10%.

The above example is merely illustrative of the present invention. Other accelerators than the accelerator combination shown in the example may be used, for instance, almost any so-called ultra or rapid accelerator, such as zinc dibenzyl dithiocarbamate, zinc dibutyl dithiocarbamate, piperidinium pentamethylene dithiocarbamate, carbamyl dithiocarbamates, etc., may be substituted for the zinc diethyl dithiocarbamate, or slower accelerators, such as mercapto benzothiazole, aldehyde amines, or derivatives of mercaptobenzothiazole, may be used.

In view of the many changes and modifications that may be made without departing from the principles underlying the invention, reference should be made to the appended claims for an understanding of the scope of the invention.

Having thus described my invention, what I claim and desire to protect by Letters Patent is:

1. The method of making sponge rubber which comprises chemically combining substantially all the sulphur in a latex compound containing .15 to .25% sulphur based on the rubber content of the latex, adding free sulphur to the latex, converting the thus treated latex into a latex foam, converting the foam into the desired shape, and coagulating the latex in the foam to form sponge rubber and heating to cause at least some of the added free sulphur to chemically combine with the rubber.

2. The method of making sponge rubber which comprises chemically combining substantially all the sulphur in a latex compound containing .15 to .25% sulphur based on the rubber content of the latex, adding free sulphur to the latex, converting the thus treated latex into a latex foam, converting the foam into the desired shape, and coagulating the latex in the foam to form sponge rubber and heating to further vulcanize the sponge to a combined sulphur content of at least .7% based on the rubber content.

LINWOOD A. MURRAY, Jr.